United States Patent
Meisenholder

(10) Patent No.: US 11,232,601 B1
(45) Date of Patent: Jan. 25, 2022

(54) AUDIO-TRIGGERED AUGMENTED REALITY EYEWEAR DEVICE

(71) Applicant: David Meisenholder, Los Angeles, CA (US)

(72) Inventor: David Meisenholder, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 16/730,689

(22) Filed: Dec. 30, 2019

(51) Int. Cl.
| | | |
|---|---|---|
| G09G 5/00 | (2006.01) | |
| G06T 11/00 | (2006.01) | |
| H04R 1/02 | (2006.01) | |
| H04R 1/08 | (2006.01) | |
| G10L 25/51 | (2013.01) | |
| G02B 27/01 | (2006.01) | |
| G02C 11/00 | (2006.01) | |

(52) U.S. Cl.
CPC .......... *G06T 11/00* (2013.01); *G02B 27/0172* (2013.01); *G02C 11/10* (2013.01); *G10L 25/51* (2013.01); *H04R 1/028* (2013.01); *H04R 1/08* (2013.01); *G02B 2027/014* (2013.01); *G02B 2027/0138* (2013.01); *G02B 2027/0141* (2013.01); *G02B 2027/0178* (2013.01); *H04R 2499/15* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | | |
|---|---|---|---|---|
| 2012/0062445 | A1* | 3/2012 | Haddick | H04N 5/23206 345/8 |
| 2019/0073090 | A1* | 3/2019 | Parkinson | G06F 3/0362 |

* cited by examiner

*Primary Examiner* — Gordon G Liu
(74) *Attorney, Agent, or Firm* — Culhane Meadows PLLC; Stephen J. Weed

(57) ABSTRACT

Systems, methods, and non-transitory computer readable media for augmenting scenes viewed thorough displays of an eyewear devices with audio-related image information. Scenes may be augmented by capturing, via a camera of the eyewear device, initial images of a scene, identifying features within the initial images; receiving audio-related image information (e.g., lyrics and/or images), registering the audio-related image information to the identified features, creating audio-based visual overlays including the audio-related image information registered to the identified features, and displaying the audio-based visual overlays over the scene.

21 Claims, 12 Drawing Sheets

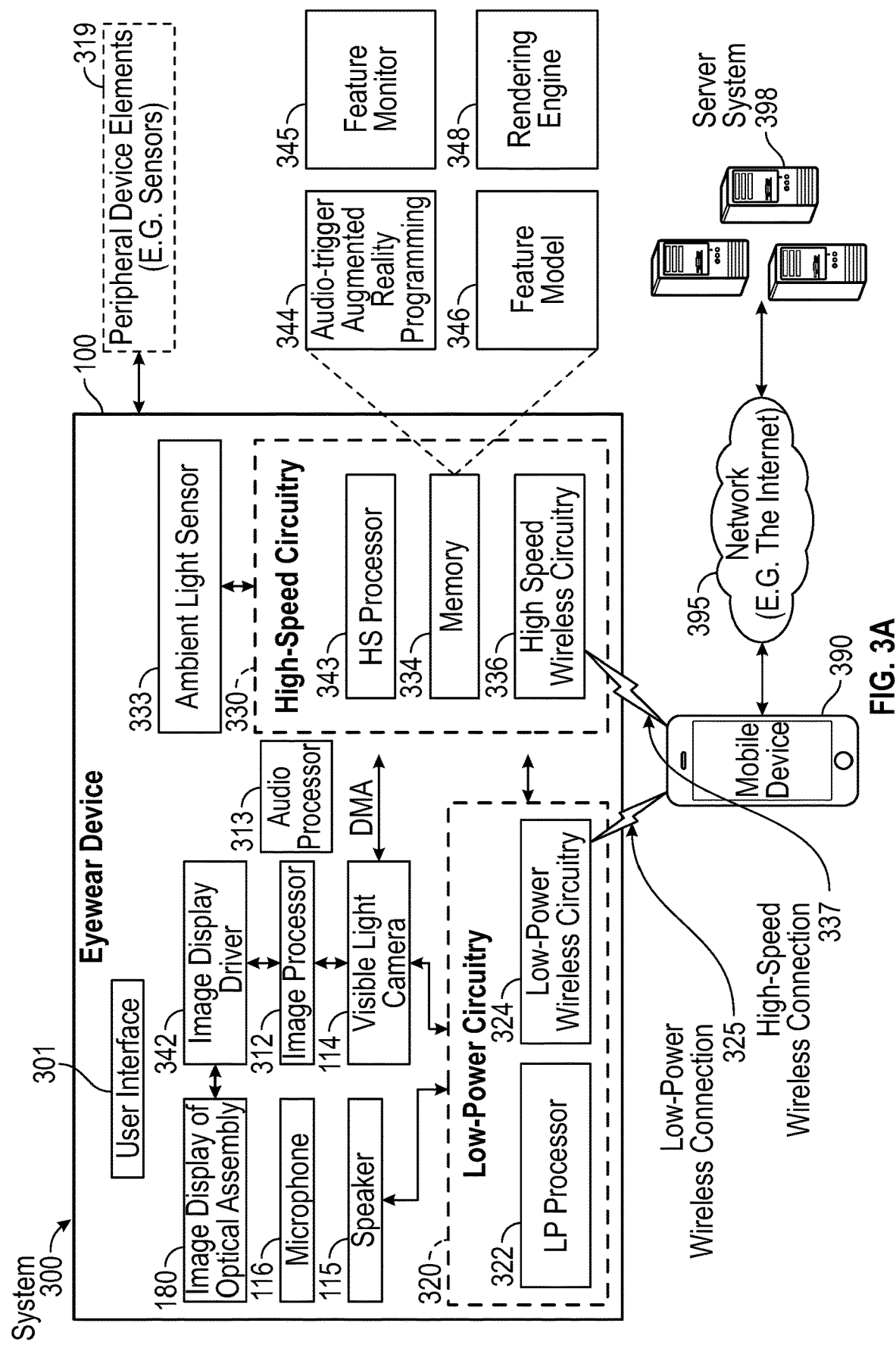

AUDIO-TRIGGERED AUGMENTED REALITY EYEWEAR DEVICE

TECHNICAL FIELD

The present subject matter relates to wearable devices, e.g., eyewear devices, and, more particularly, to visually presenting audio-related image information (e.g., lyrics and images) by a wearable device.

BACKGROUND

Wearable devices, including portable eyewear devices, such as smart glasses, headwear, and headgear, integrate image displays and cameras. Such devices can capture and present images. Wearable devices, including portable speakers, such as headphone and earbuds, can audibly present audio signals.

BRIEF DESCRIPTION OF THE DRAWINGS

The drawing figures depict non-limiting example implementations. In the figures, like reference numerals refer to the same or similar elements. When more than one of the same or similar elements are depicted a common reference number may be used with a letter designation corresponding to respective elements. When the elements are referred to collectively or a non-specific element is referenced, the letter designation may be omitted.

FIG. 3A is a high-level functional block diagram of an example audio-triggered augmented reality system including the eyewear device, a mobile device, and a server system connected via various networks.

DETAILED DESCRIPTION

Figure 1A:
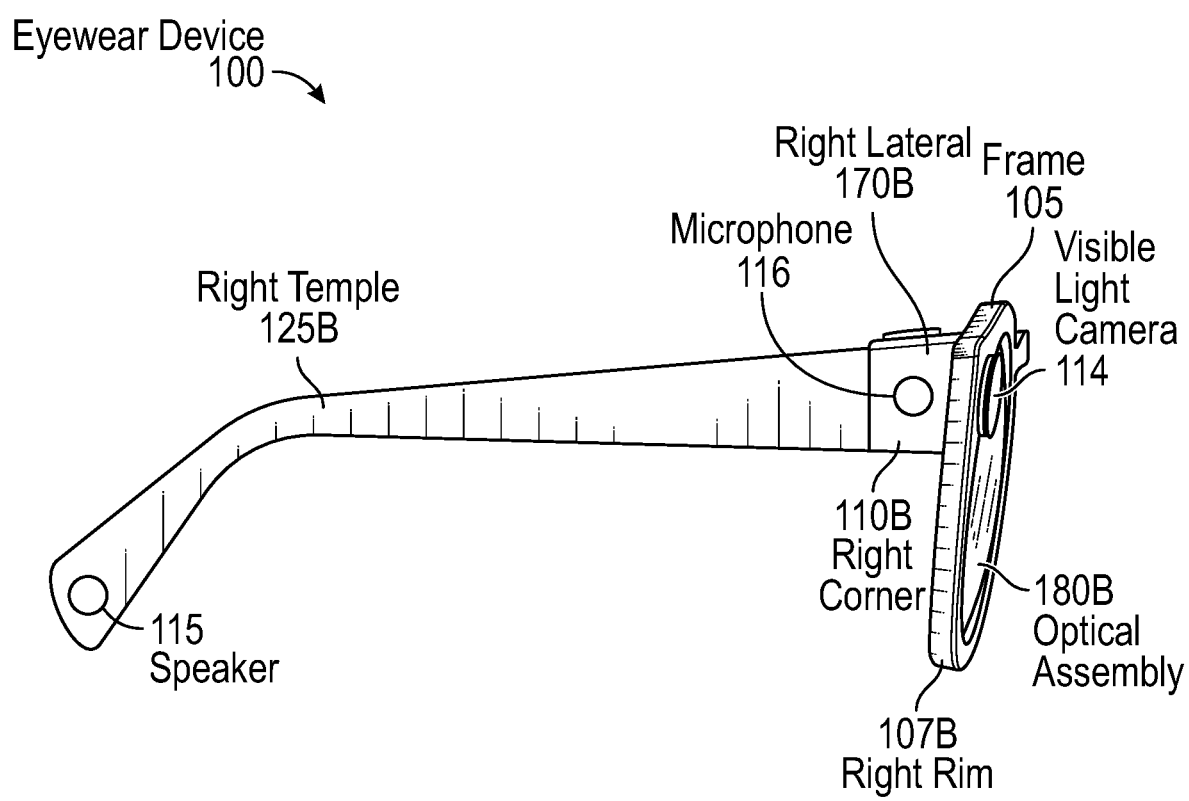
FIG. 1A is a side view of an example hardware configuration of an eyewear device, which includes a visible light camera on a corner and a speaker on a temple.

The following detailed description includes examples for augmenting scenes viewed through displays of an eyewear devices with audio-related image information. In one example, see-through optical assemblies of the eyewear devices visually present the audio-related image information. Presentation of the audio-related image information includes capturing, via a camera of the eyewear device, initial images of a scene, identifying features within the initial images; receiving audio-related image information (e.g., lyrics and/or images), registering the audio-related image information to the identified features, creating audio-based visual overlays including the audio-related image information registered to the identified features, and displaying the audio-based visual overlays over the scene.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a camera such as shown in any of the drawings, are given by way of example only, for illustration and discussion purposes. In operation, for particular audio visualization programming, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any camera or component of a camera constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to examples illustrated in the accompanying drawings and discussed below.

FIG. 1A is a side view of an example hardware configuration of an eyewear device 100, which includes at least one visible light camera 114 on a right corner 110B for capturing images in a field of views. The illustrated eyewear device 100 also includes a speaker 115 and a microphone 116.

In the example of FIG. 1A, the visible light camera 114 is sensitive to the visible light range wavelength. As shown in the example, the visible light camera 114 has a front facing field of view from the perspective of a wearer that is configured to capture images of a scene being viewed thought an optical assembly 180. Examples of such a visible light camera 114 include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. The eyewear device 100 captures image sensor data from the visible light camera 114, and optionally other data such as geolocation data and audio data (via microphone 116), digitizes the data using one or more processors, and stores the digitized data in a memory.

Visible light camera 114 may be coupled to an image processor (element 312 of FIG. 3) for digital processing along with a timestamp in which the image of a scene is captured. Image processor 312 includes circuitry to receive signals from the visible light camera 114 and process those signals from the visible light camera 114 into a format suitable for storage in the memory 334. The timestamp can be added by the image processor 312 or other processor, which controls operation of the visible light camera 114. A coupled processor 343 uses algorithms to detect and track features such as structural features, humans, animals, and faces.

Microphone 116 may be coupled to an audio processor (element 313 of FIG. 3) for digital processing along with a timestamp in which the audio is captured. Audio processor 313 includes circuitry to receive signals from the microphone 116 (or from memory) and process those signals into a format suitable for storage in the memory 334. The timestamp can be added by the audio processor 313 or other processor, which controls operation of the microphone 116. A coupled processor 343 uses algorithms to detect and extract features such as pitch, tone, volume, beat and instrument type.

In an example, a system includes the eyewear device 100. The eyewear device 100 includes a frame 105, a right temple 110B extending from a right lateral side 170B of the frame 105, and an image display (e.g., optical assembly 180A and 180B shown in FIGS. 1B and 1C) to present visual overlays to a user where the visual overlays are generated in response to audio signals. The eyewear device 100 further includes a camera (e.g., visible light camera 114) connected to the frame 105 or the right temple 110B to capture an image of a scene. The system further includes a processor (element 343 of FIG. 3A) coupled to the eyewear device 100 and connected to the camera 114, a memory 334 accessible to the processor 343, and programming in the memory 334, for example in the eyewear device 100 itself or another part of the system.

The system also includes a host computer (element 398 of FIGS. 3A and 3B) that generates a machine model to detect features utilizing, for example, neural network programming. The neural network programming generates the feature model (e.g., trains feature models) by learning features directly from sets of labeled image data without the need for manual feature extraction. The neural network programming executes on the host computer and outputs a model for storage as the feature model.

As described in further detail below, the feature model, which is a machine model trained to recognized features and associated parameters (e.g., comprising hundreds or thousands of extracted recognized features), also, or alternatively, resides on the eyewear device 100. The host computer 398 can transmit over the air updates to update the models.

In one example, a neural network is used to train the machine models. The neural network may be a pre-trained or untrained. An example of a suitable neural network is a convolutional neural network (CNN) running on the host computer that convolves features with distance parameters. The CNN may use two-dimensional convolutional layers. The CNN may extract features directly from images. The CNN can learn while the network trains on a collection of images of scenes.

During training of the neural network programming of the host computer, multiple images of scenes with features from various angles with different perspectives are fed into the host computer for processing. Images are also input with different lighting conditions and background scenes. Training by the neural network involves examining multiple images to create the feature model.

After the neural network programming of the host computer builds the feature model, the audio-triggered augmented reality programming of the eyewear device 100 is executed. Execution of the programming by the processor 343 configures the eyewear device 100 to perform functions. The eyewear device 100 captures, via the camera 114, image(s) of the scene and receives audio-related image information (e.g., from memory or from microphone 116). The eyewear device 100 identifies features within the initial images and registers the audio-related imaged information to one or more of the identified features. The eyewear device additionally creates audio-based visual overlays registered to the features that includes the audio-related image information and displays the audio-based visual overlays to the user over the scene in the viewing area (e.g., on optical assemblies 180A and 180B) of the eyewear device 100.

Feature detection and feature tracking are combined in the audio-triggered augmented reality programming of the eyewear device 100. Features (e.g., faces, buildings, building features such as arch ways, vehicles, vehicle features, humans, animals, etc.) can be detected. The feature detection and neural network programming described herein may store location coordinates of the extracted features in order to overlay a graphic (e.g., an overlay image) on the feature or pinpoint the exact location of a feature (including distance from the eyewear device 100).

Audio-triggered augmented reality programming of the eyewear device 100 runs repeatedly at certain time intervals, if the eyewear device 100 is powered and the user is active. Various optimizations to conserve battery power are implemented in the eyewear device 100. The image capture interval is adjustable in order to optimize the power consumption. In one example, the audio-triggered augmented reality programming is not run (e.g., executed) if the eyewear device 100 is running another application. In another example, the audio-triggered augmented reality programming is not run if the environment is dark, for example, based on an ambient light sensor measurement. If no ambient light sensor is available in the eyewear device 100, the time interval between which the audio-triggered augmented reality programming is run is increased. If no recognized objects/features are found in scenes over multiple images, the time interval between capturing images is also increased. If the eyewear device 100 finds a particular feature, the time interval may be extended to 10 seconds or more.

Figure 3B:
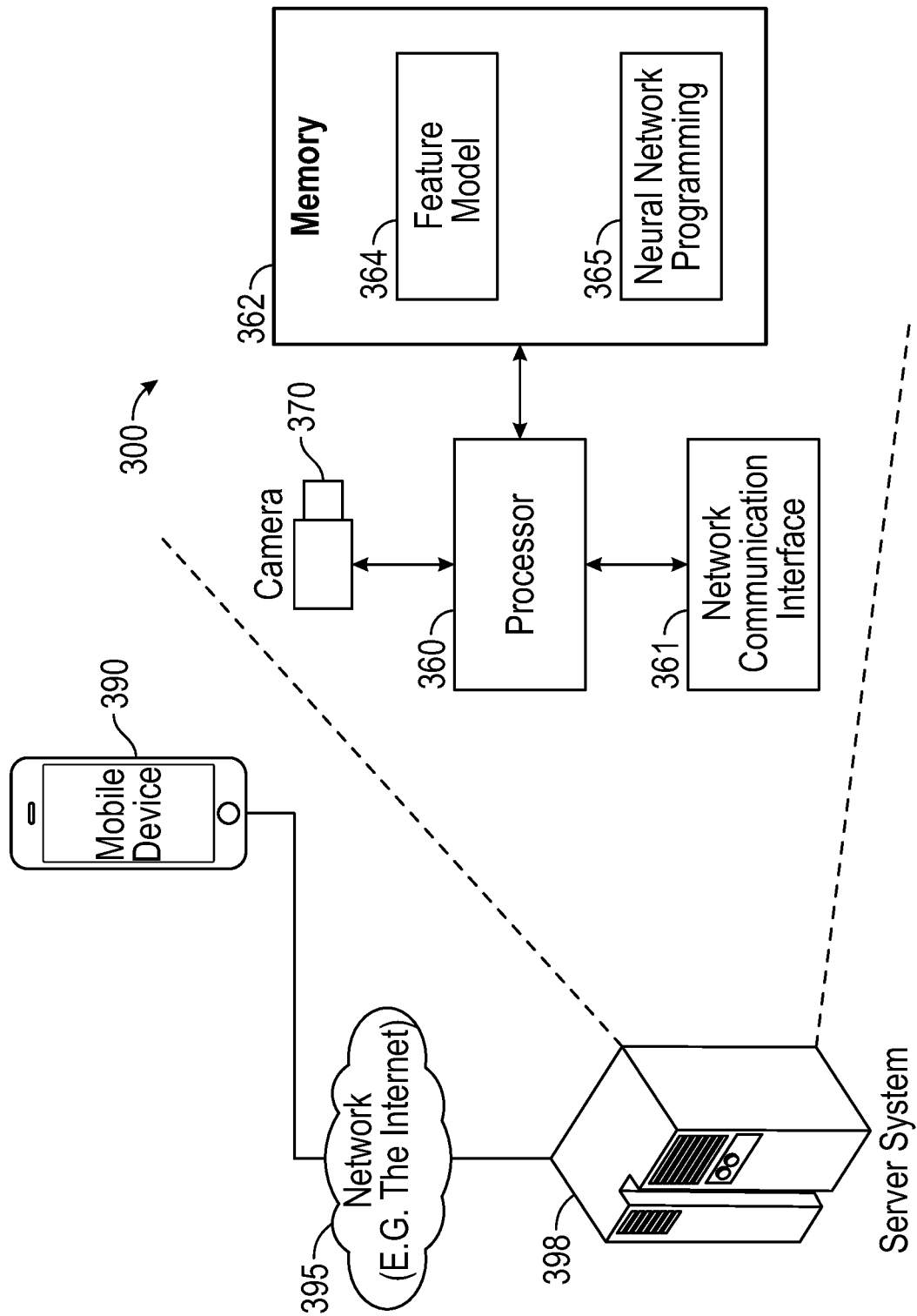
FIG. 3B shows an example of a hardware configuration for the server system of the audio-triggered augmented reality system of FIG. 3A, in simplified block diagram form.

The foregoing functionality can be embodied in programming instructions found in one or more components of the system as further described in FIGS. 3A and 3B. For example, in the neural network programming 365 of the system server 398 and the audio-triggered augmented reality programming 344 of the eyewear device 100.

Figure 1B:
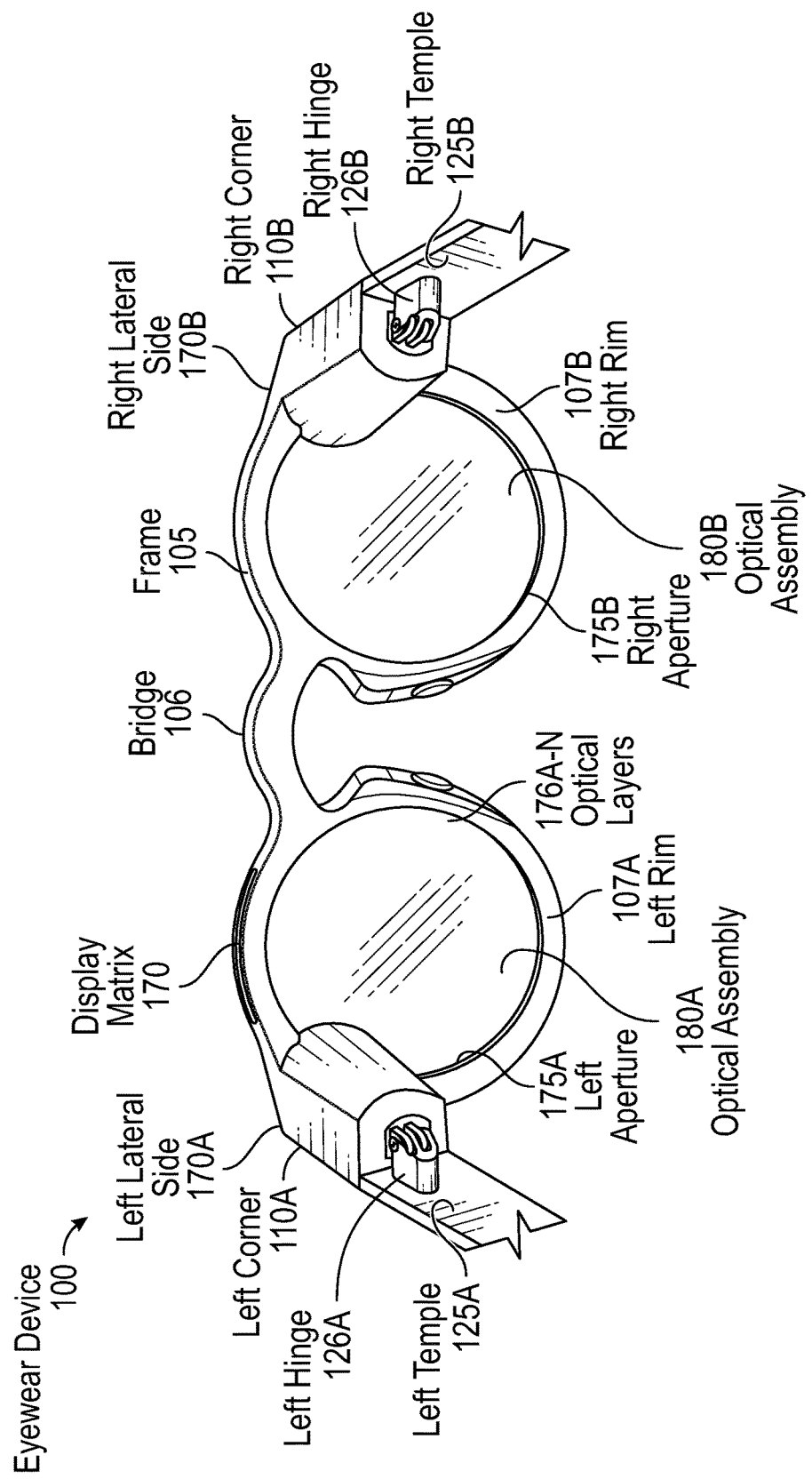
FIGS. 1B and 1C are rear views of example hardware configurations of the eyewear device of FIG. 1A, including two different types of image displays.
Figure 1C:
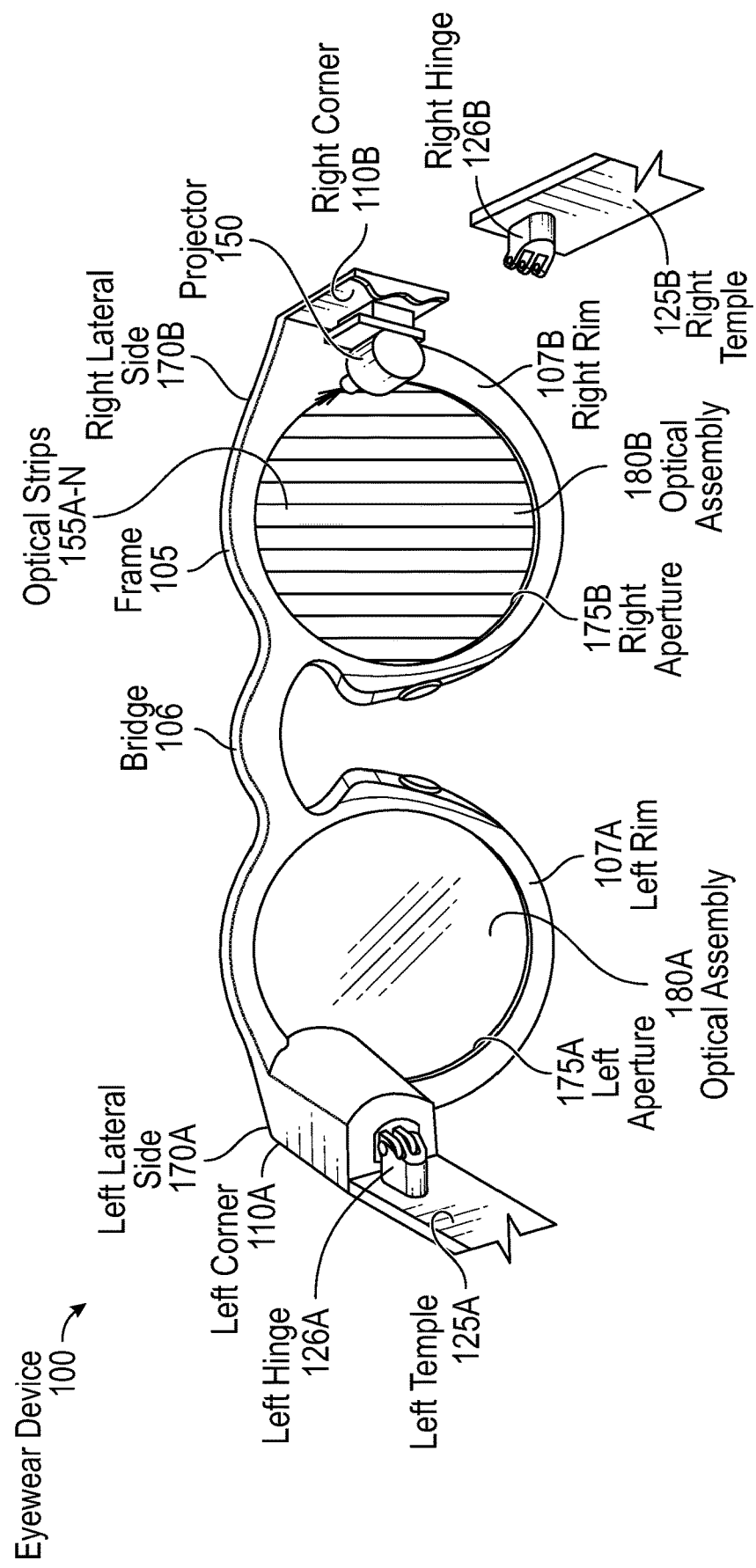

As shown in FIGS. 1A, 1B, and 1C, the eyewear device 100 is in a form for wearing by a user, which are eyeglasses in the example of FIGS. 1A, 1B, and 1C. The eyewear device 100 can take other forms and may incorporate other types of frameworks, for example, a headgear, a headset, or a helmet. In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical assembly 180A-B. Optical assembly 180A-B can include various optical layers 176A-N and an image display device. The left and right temples 125A-B extend from respective lateral sides of the frame 105, for example, via respective left and right corners 110A-B and are connected to the left and right corners 110A-B by left and right hinges 126A-B. A substrate or materials forming the temple 125A-B can include plastic, acetate, metal, or a combination thereof. The corners 110A-B can be integrated into or connected to the frame 105 on the lateral side.

FIGS. 1B and 1C are rear views of example hardware configurations of the eyewear device 100 of FIG. 1A, including two different types of image displays. In one example, the image display of optical assembly 180A-B includes an integrated image display. As shown in FIG. 1B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A and 180B includes a projection image display as shown in FIG. 1C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A and 180B includes one or more optical strips 155A-N spaced apart across the width of the lens of the optical assembly 180A and 180B or across a depth of the lens between the front surface and the rear surface of the lens.

As the photons projected by the laser projector 150 travel across the lens of the optical assembly 180A and 180B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1B and 1C, eyewear device 100 includes a left corner 110A adjacent the left lateral side 170A of the frame 105 and a right corner 110B adjacent the right lateral side 170B of the frame 105. The corners 110A-B may be integrated into the frame 105 on the respective lateral sides 170A-B (as illustrated) or implemented as separate components attached to the frame 105 on the respective sides 170A-B. Alternatively, the corners 110A-B may be integrated into temples 125A-B attached to the frame 105.

In one example, the produced visible output on the optical assembly 180A-B of the eyewear device 100 may be an overlay image that overlays or is adjacent features such as an archway or a face being tracked by the eyewear device 100. In one example, the optical assemblies 180A-B are see-through displays that present the audio-based visual overlays as overlays on a scene (or features within a scene) that the wearer is viewing through the lenses of the optical assembly. In another example the optical assemblies 180A-B are not see-through displays (e.g., are opaque displays) that present the overlay image by combining the overlay with images captured by the cameras 114 of the eyewear device for presentation to the user on the displays.

Figure 2:
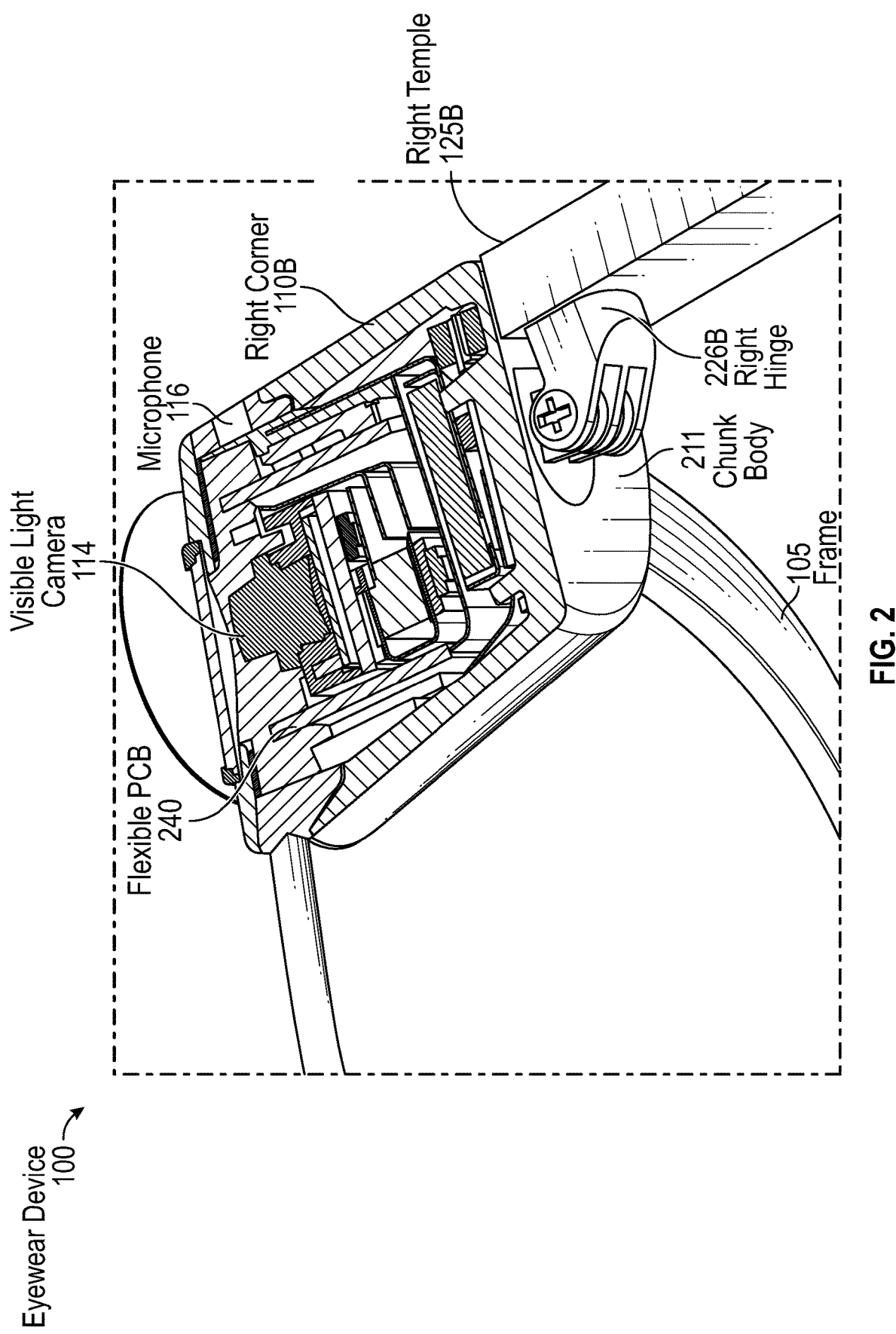
FIG. 2 is a top cross-sectional view of a corner of the eyewear device of FIG. 1A depicting the visible light camera and a circuit board.

FIG. 2 is a top cross-sectional view of the corner of the eyewear device 100 of FIG. 1A depicting the visible light camera 114 and a circuit board. As shown, the eyewear device 100 includes the visible light camera 114, a microphone 116, and a circuit board, which may be a flexible printed circuit board (PCB) 240. The right corner 110B is connected to a right temple 125B of the eyewear device 100 via the right hinge 226B. In some examples, components of the visible light camera 114, the microphone 116, the flexible PCB 240, or other electrical connectors or contacts may be located on the right temple 125B or the right hinge 226B.

The right corner 110B includes corner body 211 and a corner cap, but the corner cap is removed in the cross-section of FIG. 2. Disposed inside the right corner 110B are various interconnected circuit boards, such as PCBs or flexible PCBs, that include controller circuits for visible light camera(s) 114, microphone(s) 116, low-power wireless circuitry (e.g., for wireless short-range network communication via Bluetooth™), and high-speed wireless circuitry (e.g., for wireless local area network communication via WiFi).

The visible light camera 114 is coupled to or disposed on the flexible PCB 240 and covered by a visible light camera cover lens, which is aimed through opening(s) formed in the right corner 110B. In some examples, the frame 105 connected to the right corner 110B includes the opening(s) for the visible light camera cover lens. The frame 105 includes a front-facing side configured to face outward away from the eye of the user. The opening for the visible light camera cover lens is formed on and through the front-facing side. In the example, the visible light camera 114 has an outward facing field of view with a line of sight of the user of the eyewear device 100. The visible light camera cover lens can also be adhered to an outward facing surface of the right corner 110B in which an opening is formed with an outward facing field of view, but in a different outward direction. The coupling can also be indirect via intervening components.

Flexible PCB 240 is disposed inside the right corner 110B and is coupled to one or more other components housed in the right corner 110B. Although shown as being formed on the circuit boards of the right corner 110B, the visible light camera 114 can be formed on the circuit boards of the left corner 110A, the temples 125A-B, or frame 105.

FIG. 3A is a high-level functional block diagram of an example audio-triggered augmented reality system 300. The audio-triggered augmented reality system 300 includes a wearable device, which is the eyewear device 100 in the example. The wearable device can communicate via one or more wireless networks or wireless links with mobile device 390 or server system 398. The audio-triggered augmented reality system 300 further includes a mobile device 390 and server system 398. Mobile device 390 may be a smartphone, tablet, laptop computer, access point, or any other such device capable of connecting with eyewear device 100 using both a low-power wireless connection 325 and a high-speed wireless connection 337. Mobile device 390 is connected to server system 398 and network 395. The network 395 may include any combination of wired and wireless connections.

Eyewear device 100 includes and supports a visible light camera 114, speaker 115, microphone 116, user interface 301, image display of the optical assembly 180, image display driver 342, image processor 312, audio processor 313, low-power circuitry 320, and high-speed circuitry 330. The components shown in FIG. 3A for the eyewear device 100 are located on one or more circuit boards, for example a PCB or flexible PCB, in the temples. Alternatively, or additionally, the depicted components can be located in the corners, frames, hinges, or bridge of the eyewear device 100. Visible light camera 114 can include digital camera elements such as a complementary metal-oxide-semiconductor (CMOS) image sensor, charge coupled device, a lens, or any other respective visible or light capturing elements that may be used to capture data, including images of scenes with unknown objects. Memory 334 includes audio-triggered augmented reality programming 344, a feature monitor 345, and a feature model 346 to perform the functions described herein for audio visualization. Memory 334 additionally includes a rendering engine 348 for rendering audio-based visual overlays on the displays 180A and 180B using image processor 312 and image display driver 342.

Audio-triggered augmented reality programming 344 implements instructions to cause the eyewear device 100 to capture, via the visible light camera 114, image(s) of a scene, to detect and track features (e.g., utilizing feature monitor 345 and feature model 346) as they move with respect to the eyewear 100, and to register audio-related image information to the features.

As shown in FIG. 3A, high-speed circuitry 330 includes high-speed processor 343, memory 334, and high-speed wireless circuitry 336. In the example, the image display driver 342 is coupled to the high-speed circuitry 330 and operated by the high-speed processor 343 in order to drive the image display of the optical assembly 180. High-speed processor 343 may be any processor capable of managing high-speed communications and operation of any general computing system needed for eyewear device 100. High-speed processor 343 includes processing resources needed for managing high-speed data transfers on high-speed wireless connection 337 to a wireless local area network (WLAN) using high-speed wireless circuitry 336. In some examples, the high-speed processor 343 executes an operating system such as a LINUX operating system or other such operating system of the eyewear device 100 and the operating system is stored in memory 334 for execution. In addition to any other responsibilities, the high-speed processor 343 executing a software architecture for the eyewear device 100 manages data transfers with high-speed wireless circuitry 336. In some examples, high-speed wireless circuitry 336 is configured to implement Institute of Electrical and Electronic Engineers (IEEE) 802.11 communication standards, also referred to herein as Wi-Fi. In other examples, other high-speed communications standards may be implemented by high-speed wireless circuitry 336.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes any storage device capable of storing various data and applications, including, among other things, camera data generated by the visible light camera 114 and the image processor 312, as well as images generated for display by the image display driver 342 on the image display of the optical assembly 180 and audio data generated by the microphone 116 and the audio processor 313. While memory 334 is shown as integrated with high-speed circuitry 330, in other examples, memory 334 may be an independent standalone element of the eyewear device 100. In some examples, electrical routing lines may provide a connection through a chip that includes the high-speed processor 343 from the image processor 312/audio processor 313 or low-power processor 322 to the memory 334. In other examples, the high-speed processor 343 may manage addressing of memory 334 such that the low-power processor 322 will boot the high-speed processor 343 any time that a read or write operation involving memory 334 is needed.

As further shown in FIG. 3B, server system 398 may be one or more computing devices as part of a service or network computing system connected to camera 370, for example, that include a processor 360, a memory 362, and network communication interface 361 to communicate over the network 395 with the mobile device 390 and eyewear device 100. The memory 362 includes a feature model 364 and neural network programming 365.

In one example, server system 398 receives, via the network 395, the image of the scene from the eyewear device 100 via the mobile device 390. In another example, server system 398 connects, via the network communication interface 361, to the eyewear device 100 via the mobile device 390 or another computing device of a different user over the network 395.

The feature model 346 of the eyewear device 100 can be a mirror image of the feature model 364 of the server system 398. Feature model 346 of the eyewear device 100 is stored locally in a read-only memory (ROM), erasable programmable read-only memory (EPROM), or flash memory of high-speed circuitry 330.

Eyewear device 100 further includes an ambient light sensor 333 and detects, via the ambient light sensor 333, the illuminance of the environment in which the eyewear device 100 is located. The eyewear device 100 determines whether the detected illuminance of the environment exceeds an illuminance brightness threshold or is below an illuminance darkness threshold. Upon determining that the detected illuminance exceeds the illuminance brightness threshold or is below the illuminance darkness threshold, the eyewear device 100 throttles back the sampling interval of the capturing, via the camera 114, the image of the scene. The ambient light-based adjustment to the sampling interval for capturing the image of the scene may be implemented in the application layer of the audio-triggered augmented reality programming 344. Although not shown, eyewear device 100 can also include a proximity sensor, which detects if the user is currently wearing the eyewear device 100, to optimize power consumption.

Eyewear device 100 is connected with a host computer. For example, the eyewear device 100 is paired with the mobile device 390 via the high-speed wireless connection 337 or connected to the server system 398 via the network 395. In one example, eyewear device 100 receives audio-related images that can be overlaid with a feature such as a face being tracked with the eyewear device 100 or positioned adjacent a feature such as an archway.

Output components of the eyewear device 100 include visual components, such as the image display of optical assembly 180 as described in FIGS. 1B and 1C (e.g., a display such as a liquid crystal display (LCD), a plasma display panel (PDP), a light emitting diode (LED) display, a projector, or a waveguide). The image display of the optical assembly 180 is driven by the image display driver 342. The output components of the eyewear device 100 further include acoustic components (e.g., speakers), haptic components (e.g., a vibratory motor), other signal generators, and so forth. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Audio-triggered augmented reality system 300 may optionally include additional peripheral device elements 319. Such peripheral device elements 319 may include biometric sensors, additional sensors, or display elements integrated with eyewear device 100. For example, peripheral device elements 319 may include any I/O components including output components, motion components, position components, or any other such elements described herein.

For example, the biometric components of the audio-triggered augmented reality system 300 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

In one example, image processor 312 comprises a microprocessor integrated circuit (IC) configured to process image sensor data from the visible light camera 114, along with volatile memory used by the microprocessor to operate. In order to reduce the amount of time that image processor 312 takes when powering on to processing data, a non-volatile read only memory (ROM) may be integrated on the IC with instructions for operating or booting the image processor 312. This ROM may be minimized to match a minimum size needed to provide basic functionality for gathering sensor data from visible light camera 114, such that no extra functionality that would cause delays in boot time are present. The ROM may be configured with direct memory access (DMA) to the volatile memory of the microprocessor of image processor 312. DMA allows memory-to-memory transfer of data from the ROM to system memory of the image processor 312 independent of operation of a main controller of image processor 312. Providing DMA to this boot ROM further reduces the amount of time from power on of the image processor 312 until sensor data from the visible light camera 114 can be processed and stored. In some examples, minimal processing of the camera signal from the visible light camera 114 is performed by the image processor 312, and additional processing may be performed by applications operating on the mobile device 390 or server system 398.

Low-power circuitry 320 includes low-power processor 322 and low-power wireless circuitry 324. These elements of low-power circuitry 320 may be implemented as separate elements or may be implemented on a single IC as part of a system on a single chip. Low-power processor 322 includes logic for managing the other elements of the eyewear device 100. Low-power processor 322 is configured to receive input signals or instruction communications from mobile device 390 via low-power wireless connection 325. Additional details related to such instructions are described further below. Low-power wireless circuitry 324 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 324. In other examples, other low power communication systems may be used.

Figure 4:
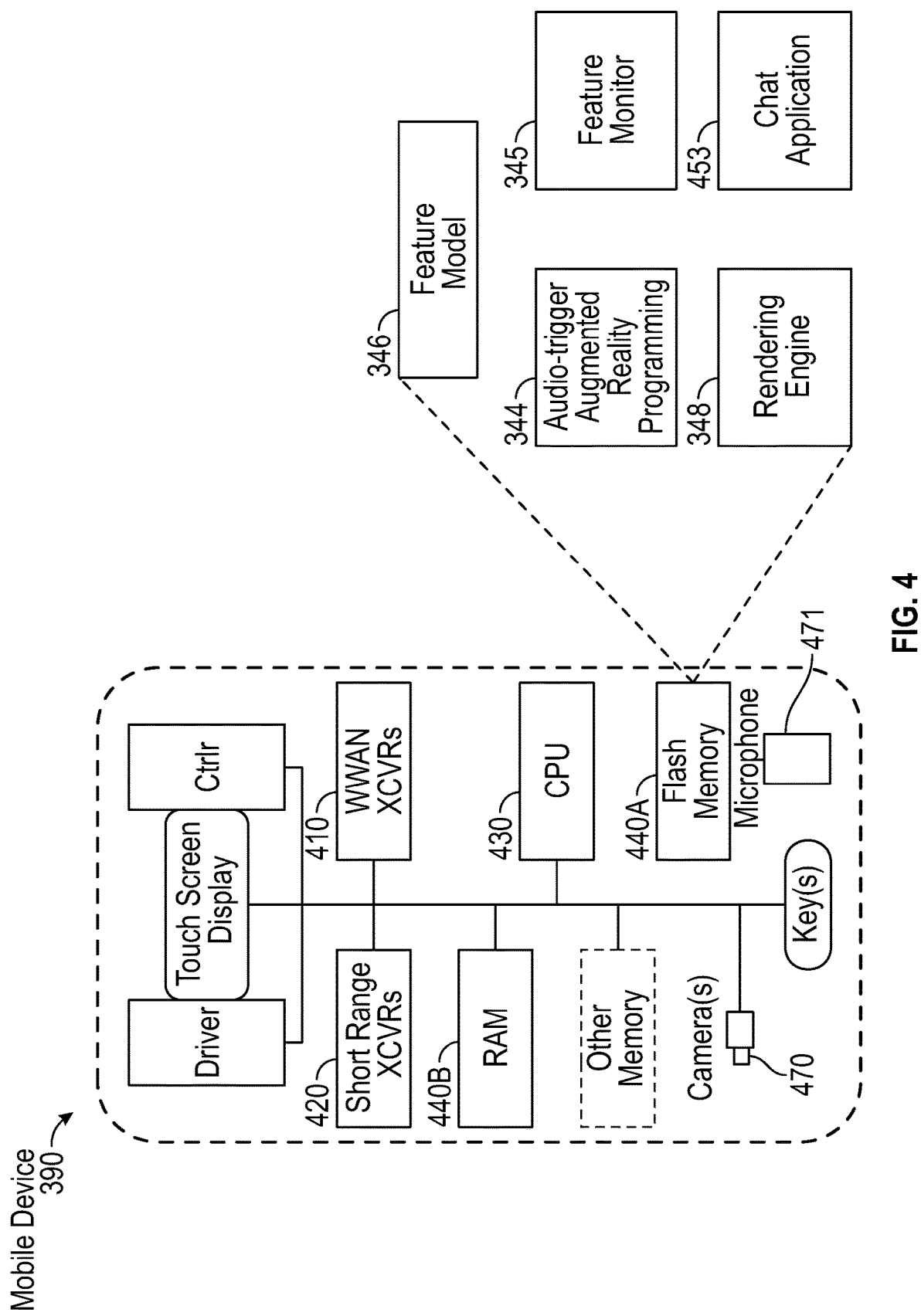
FIG. 4 shows an example of a hardware configuration for the mobile device of the audio-triggered augmented reality system of FIGS. 3A and 3B, in simplified block diagram form.

Mobile device 390 and elements of network 395, low-power wireless connection 325, and high-speed wireless architecture 337 may be implemented using details of the architecture of mobile device 390, for example utilizing the short range XCVRs and WWAN XCVRs of mobile device 390 described in FIG. 4.

FIG. 4 is a high-level functional block diagram of an example of a mobile device 390 that provides processing for the audio-triggered augmented reality system 300 of FIGS. 3A and 3B. Shown are elements of a touch screen type of mobile device 390 having audio-triggered augmented reality programming 344 loaded along with other applications such as chat application 453. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides a block diagram illustration of the example mobile device 390 having a touch screen display for displaying content and receiving user input as (or as part of) the user interface. Mobile device 390 also includes a camera(s) 470, such as visible light camera(s), and a microphone 471.

As shown in FIG. 4, the mobile device 390 includes at least one digital transceiver (XCVR) 410, shown as WWAN XCVRs, for digital wireless communications via a wide area wireless mobile communication network. The mobile device 390 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390, the mobile device 390 can include a global positioning system (GPS) receiver. Alternatively, or additionally the mobile device 390 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 420.

The transceivers 410, 420 (network communication interfaces) conform to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 for user authorization strategies.

Several of these types of communications through the transceivers 410, 420 and a network, as discussed previously, relate to protocols and procedures in support of communications with the eyewear device 100 or the server system 398 for facial recognition. Such communications, for example, may transport packet data via the short range XCVRs 420 over the wireless connections 325 and 337 to and from the eyewear device 100 as shown in FIGS. 3A-C. Such communications, for example, may also transport data utilizing IP packet data transport via the WWAN XCVRs 410 over the network (e.g., Internet) 395 shown in FIGS. 3A-C. Both WWAN XCVRs 410 and short range XCVRs 420 connect through radio frequency (RF) send-and-receive amplifiers (not shown) to an associated antenna (not shown).

The mobile device 390 further includes a microprocessor, shown as CPU 430, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 430 or processor hardware in smartphone, laptop computer, and tablet.

The microprocessor 430 serves as a programmable host controller for the mobile device 390 by configuring the mobile device 390 to perform various operations, for example, in accordance with instructions or programming executable by processor 430. For example, such operations may include various general operations of the mobile device, as well as operations related to feature detection communications with the eyewear device 100 and server system 398. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 440A and a random access memory (RAM) 440B. The RAM 440B serves as short term storage for instructions and data being handled by the processor 430, e.g., as a working data processing memory. The flash memory 440A typically provides longer term storage.

Hence, in the example of mobile device 390, the flash memory 440A is used to store programming or instructions for execution by the processor 430 to implement one or more of the functions described herein. Depending on the type of device, the mobile device 390 stores and runs a mobile operating system through which specific applications, which may include the audio-triggered augmented reality programming 344, feature monitor 345, feature model 346, and rendering engine 348, are executed. However, in some implementations, the audio-triggered augmented reality programming 344, feature monitor 345, feature model 346, or rendering engine 348 may be implemented in firmware or a combination of firmware and an application layer as described with the eyewear device 100. Applications, like the audio-triggered augmented reality programming 344 and other applications, may be a native application, a hybrid application, or a web application (e.g., a dynamic web page executed by a web browser) that runs on mobile device 390. Examples of mobile operating systems include Google Android, Apple iOS (I-Phone or iPad devices), Windows Mobile, Amazon Fire OS, RIM BlackBerry operating system, or the like.

Figure 5A:
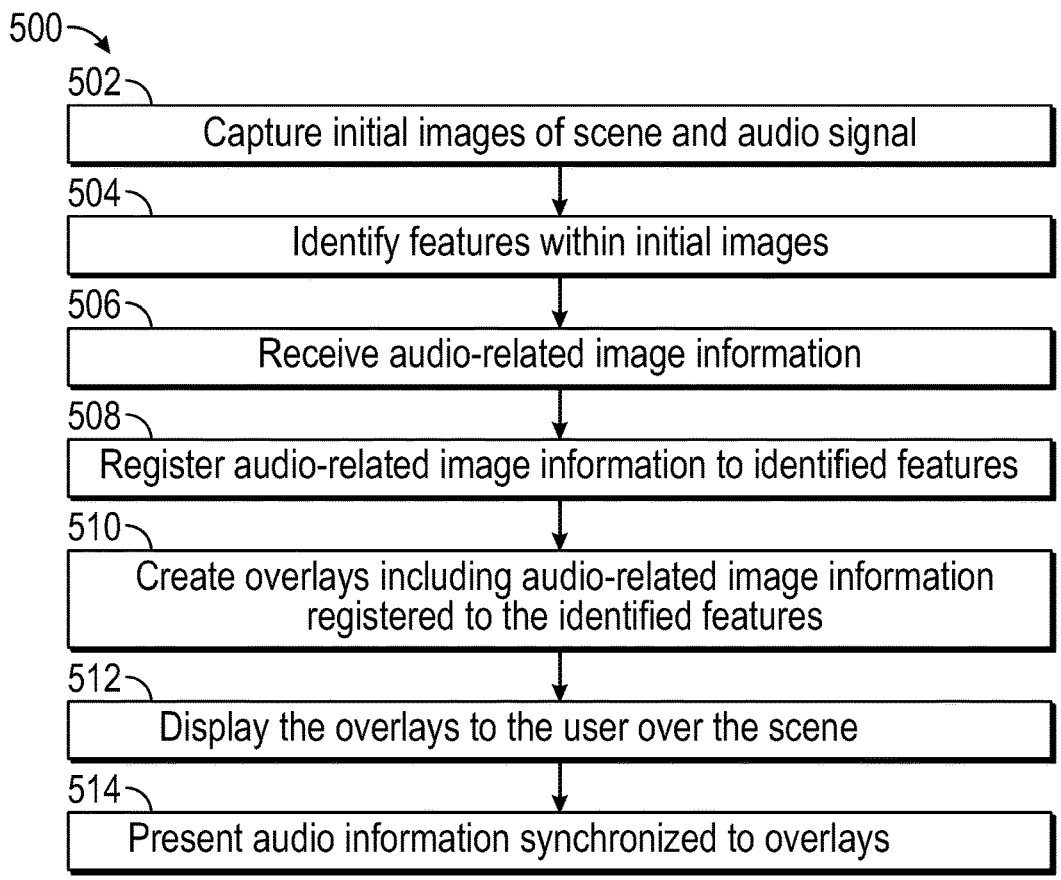
FIG. 5A is a flowchart of example steps for operation of a wearable device or a mobile device and other components of the audio-triggered augmented reality system of FIGS. 3A and 3B.
Figure 5B:
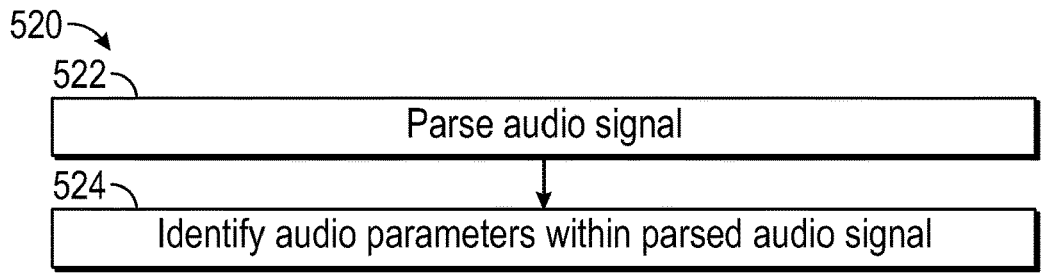
FIG. 5B is a flowchart of example steps for identifying audio parameters for operation of a wearable device or a mobile device and other components of the audio-triggered augmented reality system of FIGS. 3A and 3B.
Figure 5C:
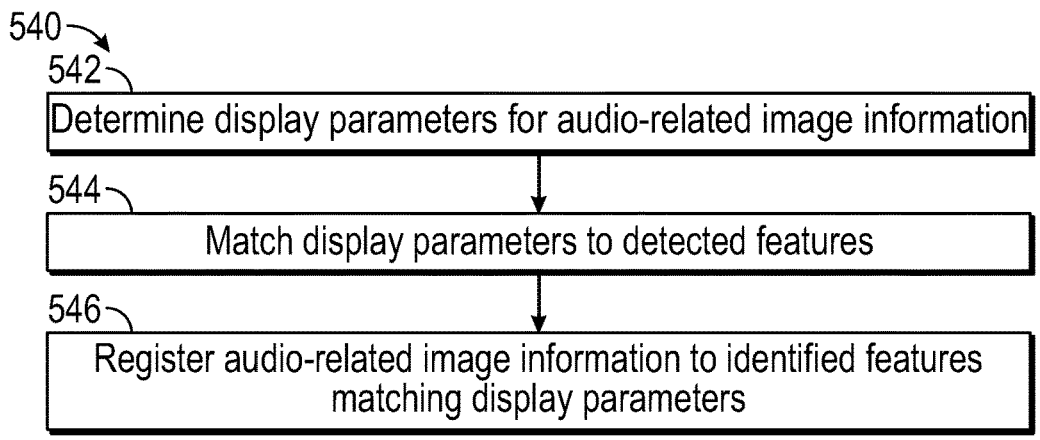
FIG. 5C is a flowchart of example steps for registering audio-based visual overlays to features in an image scene of a wearable device in the audio-triggered augmented reality system of FIGS. 3A and 3B.

FIGS. 5A, 5B, and 5C are flowcharts 500, 520, and 540, respectively, illustrating example operation of a wearable device (e.g., an eyewear device 100) or a mobile device 390 and other components of the audio-triggered augmented reality system 300. Although shown as occurring serially, one or more of the blocks in flow charts 500, 520, and/or 540 may be reordered or parallelized depending on the implementation.

At block 502, capture initial images of a scene and an audio signal. The image processor 312 may capture the images using visible light camera 114. In one example, image processor 312 captures images from one visible light camera 114. In another example, image processor 312 captures images from two visible light cameras 114 having overlapping fields of view.

The audio processor 313 captures a prerecorded audio signal or a live audio signal. In one example, audio processor 313 retrieves an audio signal such as a prerecorded song from memory 334. In another example, audio processor 313 captures live audio from the environment where the eyewear device 100 is located via microphone 116, e.g., at a concert or in the wearer's home.

The captured audio signal may be processed using the example technique 520 shown in FIG. 5B. At block 522, parse the audio signal. The audio processor 313 parses the audio signal by separating audio tracks within the audio signal and dividing the audio signal into discrete packets of information including timing information. At block 524, identify audio parameters within the parsed audio signal. The audio processor 313 identifies audio parameters such as pitch, tone, volume, beat and instrument type (including vocal). The audio processor 313 may identify audio parameters by comparing the discrete packets of information to known packets of a similar type.

Referring back to FIG. 5A, at block 504, identify features within the initial images. Image processor 312 identifies features such as a head or an archway utilizing feature detection (e.g., computer vision) algorithms and feature model 346. Positional information within a scene for the detected features is stored in memory by feature monitor 345.

At block 506, receive audio-related image information. In one example, audio-related image information is an image (such as a pair of lips or likeness of a band) that is related to the audio signal and/or may be synchronized with the audio signal. The image may be prerecorded lyrics/words received from an external source via a network. In another example, the audio-related image information is lyrics/words that may be synchronized with the audio signal. The lyrics/words may be prerecorded lyrics/words received from an external source via a network or may be live lyrics/words captured by microphone 116, e.g., at a concert, and converted from speech to text by audio processor 313.

At block 508, register audio-related image information to identified features. Image processor 312 registers audio-related image information to identified features. The audio-related image information may be registered using the example technique 540 shown in FIG. 5C.

At blocks 542 and 544 of FIG. 5C, determine display parameters from audio-related image information and match the display parameters to detected features, respectively. The audio-related image information includes the display parameters, which may identify a specific feature and/or position for displaying the audio-related image information. For example, a display parameter may be a center of the display, overlaying a head of a human, adjacent a head of a human (above/below/right/left), under an archway, etc. The display parameters may additionally include a number of times for display of the audio-related image information, e.g., once in the largest archway detected, five times in the five largest archways, or in all archways detected in the scene. Additionally, the display parameters may provide a hierarchy for displaying an image, e.g., present as an overlay on a head of a human and optionally present as an overlay on a head of an animal if a human is not present in a scene.

At block 546, register audio-related image information to identified features matching the display parameters. In one example, lyrics/words are registered to a head of a human that the wearer of the eyewear device 100 is visually focusing on (e.g., as determined by eye tracking components; not shown) or that is producing the lyrics/words (e.g., as determined by monitoring lip movements of human heads in the scene or directionally based on processing of stereo sound signals obtained by microphones 116 on respective sides of the eyewear device 100). In another example, a series of cartoon character images are registered to a flat portion of ground that does not include people. In another example, an image of a band is registered to the largest archway in the scene.

Referring back to FIG. 5A, at block 510, create audio-based visual overlays. The image processor 312 creates that audio-based visual overlays from the audio-related image information. The image processor utilizes the registration information to determine the position on the display and, optionally, size of the image. The image processor 312 may additional utilize the audio signal in creating the audio-based visual overlays. For example, if the overlay image is a moving pair of lips, the image processor 312 may create lips that open/close responsive to the lyrics and/or tempo of the audio signal.

At block 512, display the overlay image(s) on an image display. Each overlay image is presented in a location corresponding to the feature to which it is registered. The overlay image may be presented over the feature or adjacent the feature (e.g., above/below/right/left. The high-speed circuitry 330 may present the overlay image to a wearer of the eyewear device 100 on optical displays 180 of the eyewear device 100. In one example, the overlay image may be displayed on a see-through display. In another example, the overlay image may be blended with a current image captured by the camera(s) 114 and displayed on a non-see-through display. At block 514, the audio information is presented synchronized to the overlays.

Figure 6A:
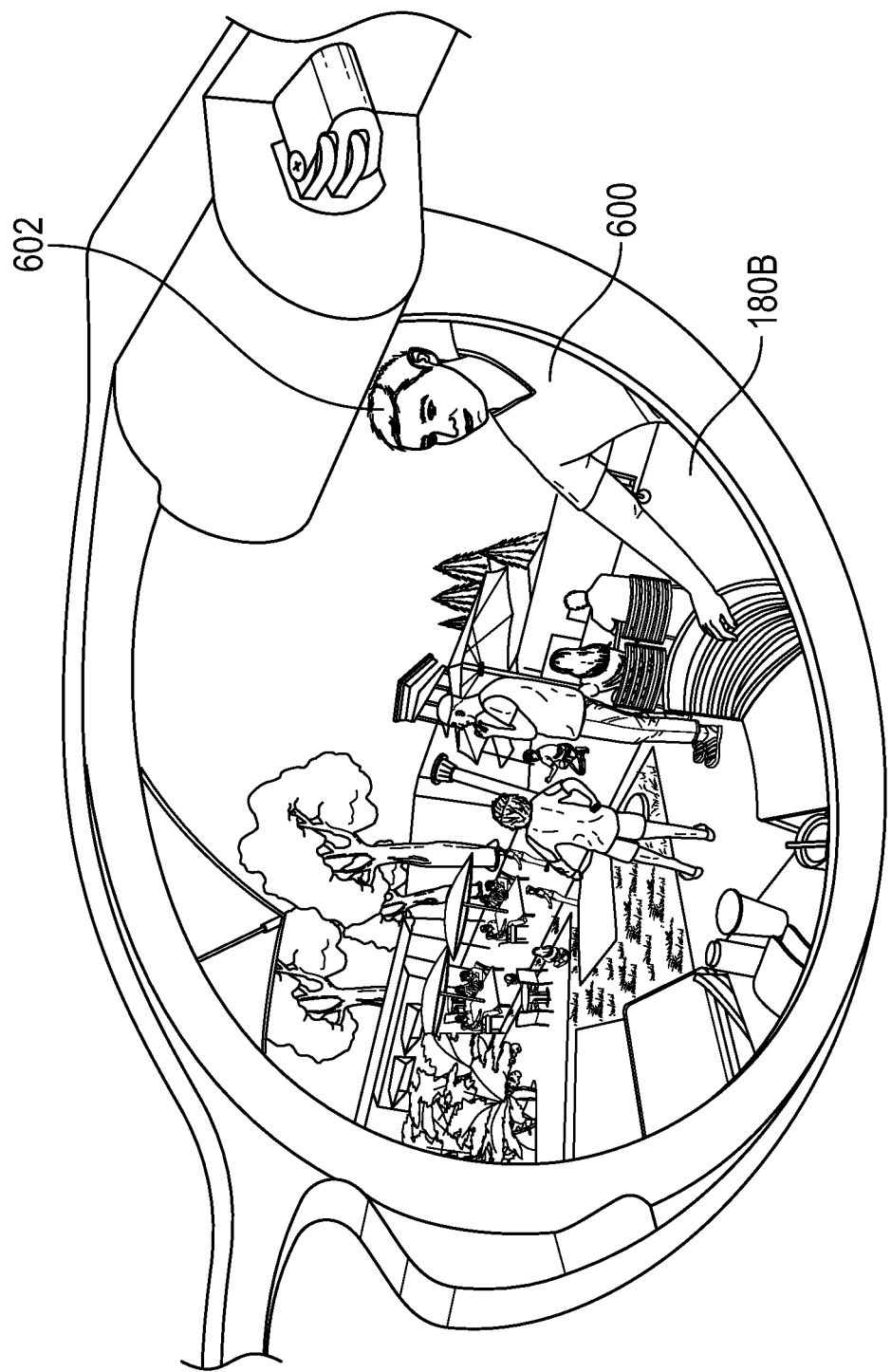
FIG. 6A is a perspective view of a scene viewed through a see-though optical assembly of an eyewear device.

FIG. 6A is a perspective view of a scene viewed through an optical assembly 180 of an eyewear device 100. The optical assembly 180 enables a wearer of the eyewear device 100 to view a scene through the optical assembly 180. FIG. 6A depicts a human 600 with a head 602 in a casual environment. In an example, the audio-triggered augmented reality programming 344 utilizing feature monitor 345 and feature model 346 detects and tracks the human 600 and the head 602 (among other features) as potential features for registering with audio-based visual overlays.

For see-through optical assemblies, a wearer of the eyewear device is able to see the scene unobstructed and, if present, with an overlay image(s). For non-see-through optical assemblies, a wearer of the eyewear device is able to see an image of the scene in a field of view of a camera 114 capturing the scene and, if present, with an overlay image(s).

Figure 6B:
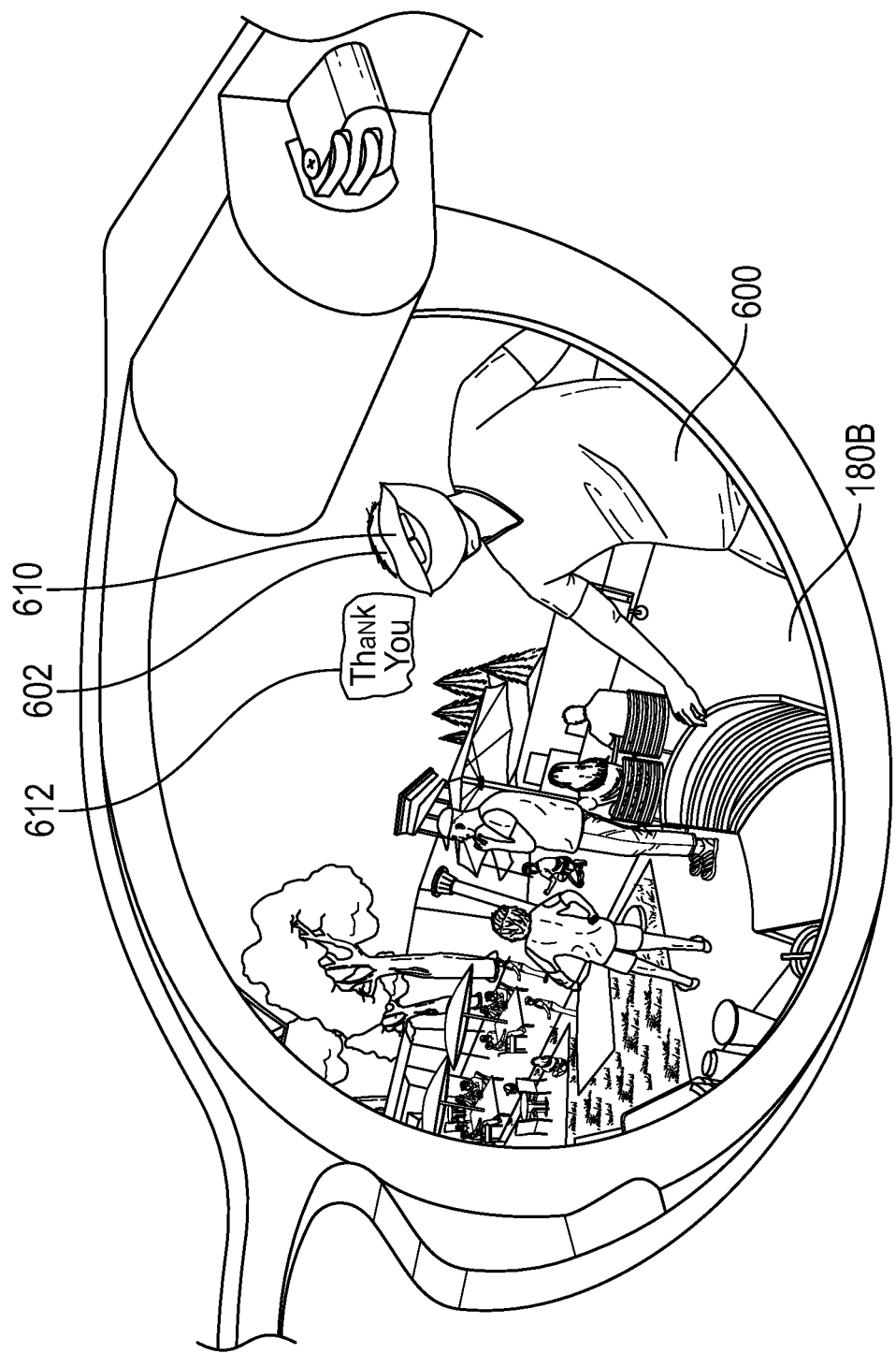
FIG. 6B is a perspective view of a scene viewed through the see-though optical assembly of FIG. 6A with audio-based visual overlays registered to a head augmenting the scene.

FIG. 6B is a perspective view of the scene of FIG. 6A with overlays registered to a feature. Audio-triggered augmented reality programming 344 creates audio-based visual overlays and registers the audio-based visual overlays to features based on audio-related image information associated with the audio signal. FIG. 6B depicts a first overlay of lips 610 registered to a head 602 of a human 600 (with a positional designation of over the registered feature) and a second overlay of lyrics 612 also registered to the head 602 (with a positional designation to the left of the registered feature). By registering the audio-based visual overlays to the features, the audio-based visual overlays will follow the features as they move within the scene.

Audio-based visual overlays such as the lips 610 may be single static image, a video clip, or a series of images, e.g., depicting the lips 610 in various states such as closed, partially open, and fully open. The audio-related image information additionally designates how the image reacts to the audio signal. When a single overlay image is present it may pulse in response to the tempo and/or change color in response to the tone. When a series of images are available, the overlay image may change in response to tempo and/or lyrics to give the appearance that, for example, the lips 610 are the source of the lyrics.

Figure 6C:
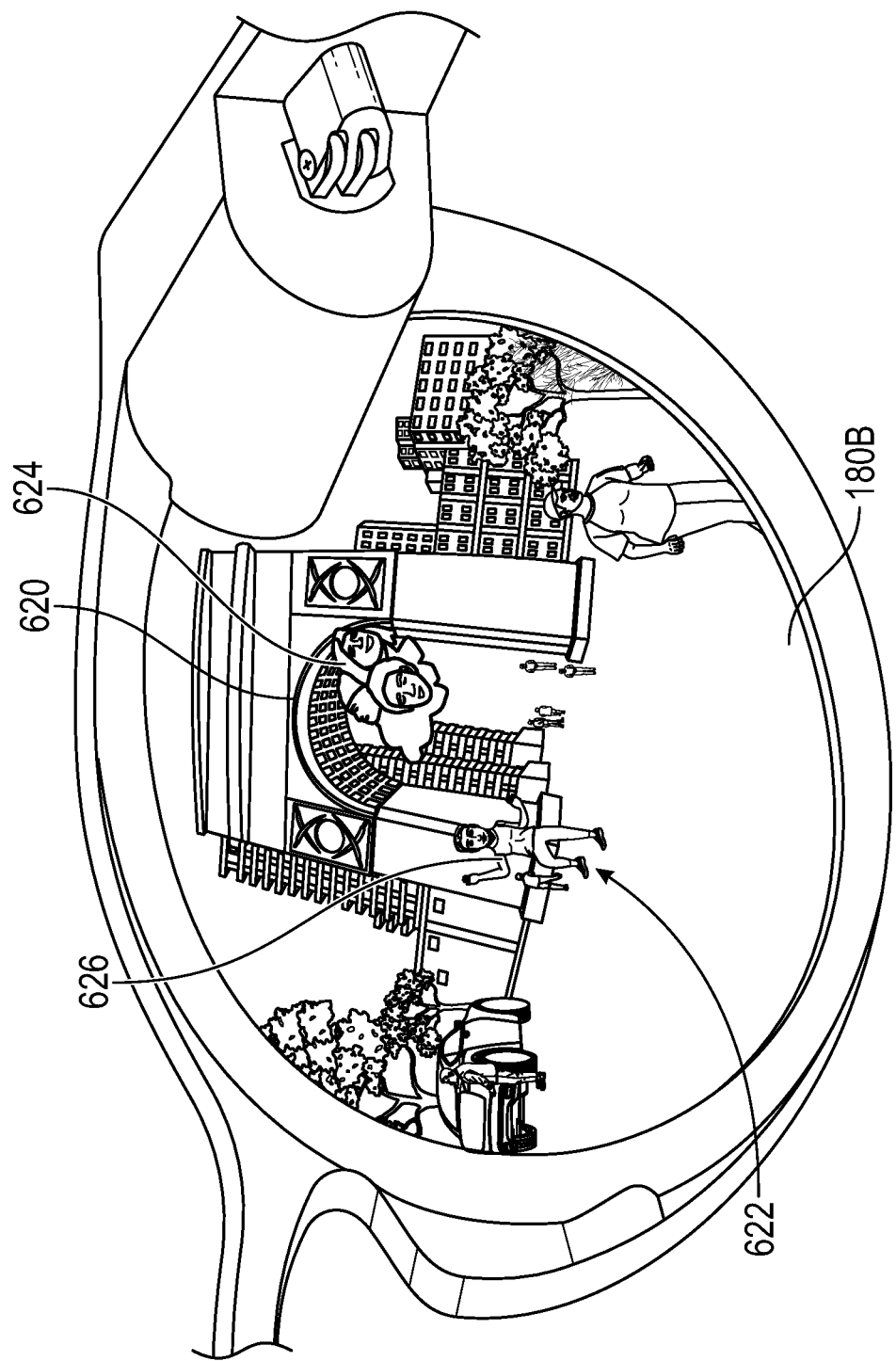
FIG. 6C is a perspective view of a scene viewed through the see-though optical assembly of FIG. 6A with audio-based visual overlays registered to an archway and to ground augmenting the scene at a first point in time.

FIG. 6C is a perspective view of another scene with overlays depicted at a first point in time viewed through an optical assembly 180 of an eyewear device 100. FIG. 6C depicts an archway 620 and a paved flat surface 622 in an urban environment. In an example, the audio-triggered augmented reality programming 344 utilizing feature monitor 345 and feature model 346 detects and tracks the archway 620 and the paved flat surface 622 (among other features) as potential features for registering with audio-based visual overlays.

FIG. 6C depicts a first overlay of an image of a band 624 associated with the audio signal registered to the archway 620 (with a positional designation of under the archway and to the right) and a second overlay of dancing cartoon man in a first pose 626 (i.e., image of a series of images) registered to the paved flat surface 622 (with a positional designation of to the left and toward the back of the registered feature).

Figure 6D:
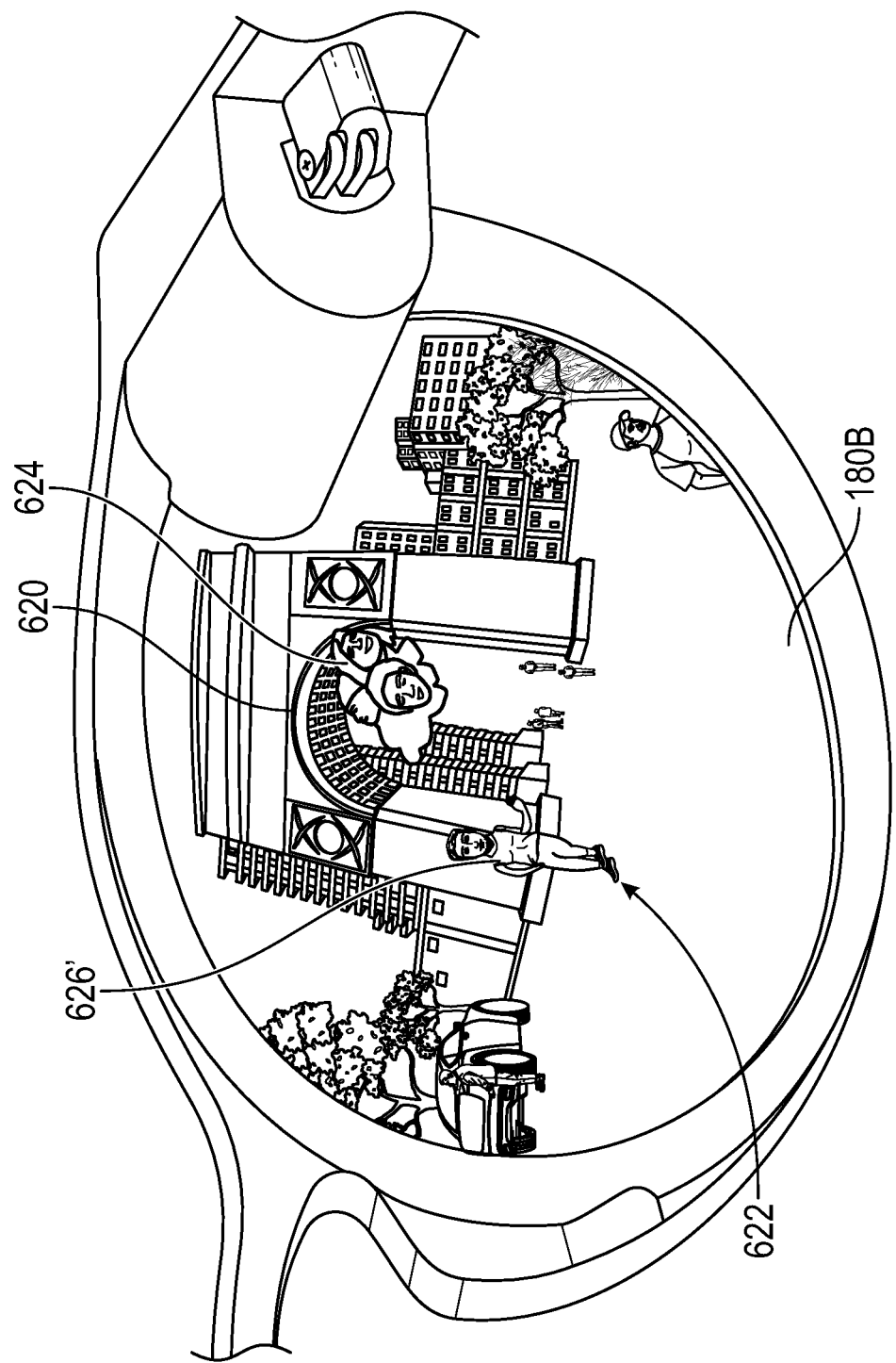
FIG. 6D is a perspective view of a scene viewed through the see-though optical assembly of FIG. 6A with the audio-based visual overlays registered to the archway and to ground augmenting the scene at a second point in time.

FIG. 6D is a perspective view of the scene of FIG. 6C with overlays depicted at a second point in time. FIG. 6D depicts the first overlay of the image of the band 624 within the archway 622 despite the movement of the archway 622 within the scene and the second overlay of the dancing cartoon man in a second pose 626' (i.e., another image of the series of images) registered to the paved flat surface 622 despite the movement of the paved flat surface 622 within the scene. The second overlay 626 changes in response to, for example, the tempo of the audio signal as specified in the audio-related image information.

Any of the method described herein such as the audio-triggered augmented reality programming, feature monitoring, and rendering methods for the eyewear device 100, mobile device 390, and server system 398 can be embodied in one or more methods as method steps or in one or more applications as described previously. According to some examples, an "application," "applications," or "firmware" are program(s) that execute functions defined in the program, such as logic embodied in software or hardware instructions. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application can invoke application programming interface (API) calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for user authorization, navigation, facial tracking or other functions described herein. "Storage" type media include any or all the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the eyewear device 100 and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   an eyewear device, including:
      a frame;
      a temple extending from a lateral side of the frame;
      a see-through optical assembly supported by the frame, the see-through optical assembly having a viewing area for viewing a scene and configured to present audio-based visual overlays to a user over the scene in the viewing area; and
      a camera connected to the frame or the temple to capture initial images of the scene;
   a processor connected to the camera;
   a memory accessible to the processor; and
   programming in the memory, wherein execution of the programming by the processor configures the system to perform functions, including functions to:
      capture, via the camera, the initial images of the scene;
      identify features within the initial images;
      receive an image that is at least one of related to or synchronized to a prerecorded or live audio signal;
      match display parameters identifying at least one of a feature or position of the image that is at least one of related to or synchronized to a prerecorded or live audio signal to one or more of the identified features within the initial images;
      create the audio-based visual overlays, the audio-based visual overlays including the image that is at least one of related to or synchronized to the prerecorded or live audio signal that has been matched to the one or more of the identified features within the initial images; and
      display, via the see-through optical assembly, the audio-based visual overlays to the user over the scene in the viewing area.

2. The system of claim 1, further comprising:
   a microphone supported by the frame or the temple;
   wherein execution of the programming by the processor further configures the system to perform additional functions, including a function to:
   capture, via the microphone, the live audio signal.

3. The system of claim 1, further comprising:
   a receiver supported by the frame or the temple;
   wherein execution of the programming by the processor further configures the system to perform additional functions, including a function to:
   receive, via the receiver, the live audio signal.

4. The system of claim 1, further comprising:
   a speaker supported by the frame or the temple;
   wherein the created audio-based visual overlays include modifications synchronized with the prerecorded or live audio signal and wherein execution of the programming by the processor further configures the system to perform additional functions, including a function to:
   present, via the speaker, the prerecorded or live audio signal synchronized with the modifications to the audio-based visual overlays.

5. The system of claim 1, further comprising:
a user interface supported by the frame or the temple;
wherein execution of the programming by the processor further configures the system to perform additional functions, including a function to:
receive, via the user interface, user input;
wherein the create function creates the image overlays responsive to the prerecorded or live audio signal and the user input.

6. The system of claim 1, wherein execution of the programming by the processor further configures the system to perform additional functions, including a function to:
detect aspects of the scene in the viewing area;
wherein the create function creates the image overlays responsive to the prerecorded or live audio signal and the aspects of the scene.

7. The system of claim 1, wherein the processor comprises:
an audio processor supported by the frame or the temple, the audio processor configured to parse the prerecorded or live audio signal to identify at least one audio parameter; and
an image processor supported by the frame or the temple, the image processor configured to:
determine the display parameters identifying at least one of the feature or position of the image that is at least one of related to or synchronized to the prerecorded or live audio signal;
match the determined display parameters to the one or more of the identified features within the initial images; and
register the image that is at least one of related to or synchronized to the prerecorded or live audio signal to the identified features within the initial images matching the determined display parameters for overlay over the scene in the viewing area.

8. The system of claim 7, wherein the at least one audio parameter is selected from a group consisting of tone, tempo, intensity, and instrument type.

9. The system of claim 1, wherein the see-through optical assembly includes a defined viewing area that includes a display area and a non-display area, wherein the audio-based visual overlays are displayed only in the display area.

10. The system of claim 1, wherein the image that is at least one of related to or synchronized to a prerecorded or live audio signal comprises at least one of prerecorded lyrics or words, a single static image, a video clip, or a series of images.

11. A method comprising:
capturing, via a camera of an eyewear device, initial images of a scene in a viewing area;
identifying features within the initial images;
receiving an image that is at least one of related to or synchronized to a prerecorded or live audio signal;
matching display parameters identifying at least one of a feature or position of the image that is at least one of related to or synchronized to a prerecorded or live audio signal to one or more of the identified features within the initial images;
creating audio-based visual overlays, the audio-based visual overlays including the image that is at least one of related to or synchronized to the prerecorded or live audio signal that has been matched to the one or more of the identified features within the initial images; and
displaying, via a see-through optical assembly of the eyewear device, the audio-based visual overlays to the user over the scene in the viewing area.

12. The method of claim 11, further comprising:
capturing, via a microphone of the eyewear device, the live audio signal.

13. The method of claim 11, further comprising:
receiving, via a receiver of the eyewear device, the live audio signal.

14. The method of claim 11, wherein the created audio-based visual overlays include modifications synchronized with the prerecorded or live audio signal, further comprising:
presenting, via a speaker of the eyewear device, the prerecorded or live audio signal synchronized with the modifications to the audio-based visual overlays.

15. The method of claim 11, further comprising:
receiving, via a user interface of the eyewear device, user input;
wherein the creating comprises modifying the audio-based visual overlays responsive to the prerecorded or live audio signal and the user input to create the audio-based visual overlays.

16. The method of claim 11, further comprising:
detecting aspects of the scene in the viewing area;
wherein the creating comprises modifying the audio-based visual overlays responsive to the prerecorded or live audio signal and the aspects of the scene to create the audio-based visual overlays.

17. The method of claim 11, further comprising:
determining the display parameters identifying at least one of the feature or position of the image that is at least one of related to or synchronized to the prerecorded or live audio signal;
matching the determined display parameters to the one or more of the identified features within the initial images; and
registering the image that is at least one of related to or synchronized to the prerecorded or live audio signal to the identified features within the initial images matching the determined display parameters for overlay over the scene in the viewing area.

18. The method of claim 11, further comprising:
parsing the prerecorded or live audio signal to identify at least one audio parameter;
wherein the at least one audio parameter is selected from a group consisting of tone, tempo, and instrument type.

19. The method of claim 11, wherein the see-through optical assembly includes a defined viewing area that includes a display area and a non-display area, wherein displaying the audio-based visual overlays comprises displaying the audio-based visual overlays only in the display area.

20. A non-transitory computer-readable medium storing program code which, when executed, is operative to cause an electronic processor to perform the steps of:
capturing, via a camera of an eyewear device, initial images of a scene in a viewing area;
identifying features within the initial images;
receiving an image that is at least one of related to or synchronized to a prerecorded or live audio signal;
matching display parameters identifying at least one of a feature or position of the image that is at least one of related to or synchronized to a prerecorded or live audio signal to one or more of the identified features within the initial images;
creating audio-based visual overlays, the audio-based visual overlays including the image that is at least one of related to or synchronized to the prerecorded or live audio signal that has been matched to the one or more of the identified features within the initial images; and displaying, via a see-through optical assembly of the eyewear device, the audio-based visual overlays to the user over the scene in the viewing area.

21. The non-transitory computer-readable medium of claim 20, wherein the stored program code, when executed, is further operative to cause the electronic processor to perform the steps of:

determining the display parameters identifying at least one of the feature or position of the image that is at least one of related to or synchronized to the prerecorded or live audio signal;

matching the determined display parameters to the one or more of the identified features within the initial images; and registering the image that is at least one of related to or synchronized to the prerecorded or live audio signal to the identified features within the initial images matching the determined display parameters for overlay over the scene in the viewing area.

\* \* \* \* \*